United States Patent
Fehse

(10) Patent No.: US 10,581,468 B2
(45) Date of Patent: Mar. 3, 2020

(54) COUPLING FOR CONNECTING AT LEAST ONE AMPLIFIER UNIT WITH AT LEAST ONE ANTENNA, SYSTEM AND METHOD FOR TRANSMITTING A SIGNAL BETWEEN AN ANTENNA AND AN AMPLIFIER UNIT OR AN ANALYZING UNIT

(71) Applicant: Rohde & Schwarz GmbH & Co. KG, Munich (DE)

(72) Inventor: Dirk Fehse, Berlin (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/881,397

(22) Filed: Jan. 26, 2018

(65) Prior Publication Data
US 2018/0212631 A1    Jul. 26, 2018

(30) Foreign Application Priority Data
Jan. 26, 2017  (EP) .................................. 17153391

(51) Int. Cl.
*H04B 1/04* (2006.01)
*H01P 5/08* (2006.01)

(52) U.S. Cl.
CPC ............. *H04B 1/0475* (2013.01); *H01P 5/08* (2013.01); *H04B 2001/0408* (2013.01)

(58) Field of Classification Search
CPC ...... H40R 24/38; H40R 24/40; H04B 1/0475; H01P 5/026; H01P 5/08; H01P 5/103

USPC ......................................................... 375/297
See application file for complete search history.

(56) References Cited

U.S. PATENT DOCUMENTS

| | | | |
|---|---|---|---|
| 2001/0002811 A1* | 6/2001 | Gregorwich | H01P 1/04 333/245 |
| 2004/0029433 A1* | 2/2004 | Lee | H01R 24/564 439/445 |
| 2012/0214340 A1 | 8/2012 | Weiss | |
| 2015/0200435 A1* | 7/2015 | Guimaraes | H04B 1/40 455/73 |

FOREIGN PATENT DOCUMENTS

JP    H01279638 A1    11/1989

OTHER PUBLICATIONS

Extended European Search Report dated Jul. 26, 2017, issued in priority European Application No. 17153391.2, filed Jan. 25, 2017, 9 pages.

* cited by examiner

*Primary Examiner* — Kevin M Burd
(74) *Attorney, Agent, or Firm* — Christensen O'Connor Johnson Kindness PLLC

(57) ABSTRACT

A coupling for interconnecting at least one amplifier unit with at least one antenna is described, wherein the coupling has a first interface that is standardized according to Electronic Industries Alliance with regard to the imperial system and a second interface that is standardized according to 13-30 DIN. Further, a system and a method for transmitting a signal between an antenna and an amplifier unit or an analyzing unit are described.

3 Claims, 1 Drawing Sheet

COUPLING FOR CONNECTING AT LEAST ONE AMPLIFIER UNIT WITH AT LEAST ONE ANTENNA, SYSTEM AND METHOD FOR TRANSMITTING A SIGNAL BETWEEN AN ANTENNA AND AN AMPLIFIER UNIT OR AN ANALYZING UNIT

TECHNICAL FIELD

Embodiments of the present disclosure relate to coupling for connecting at least one amplifier unit with at least one antenna, a system comprising such a coupling as well as a method for transmitting a signal between an antenna and an amplifier unit or an analyzing unit.

BACKGROUND

Different solutions are known in the state of the art in order to transmit signals between an antenna and an amplifier unit while using a transmission line. This transmission line may comprise a hollow conductor and a cable that are connected with each other via a coupling. For instance, couplings are known that comprise an interface being ⅞" according to the standard of the Electronic Industries Alliance (EIA). Other typically used couplings have an interface being 1⅝" according to the EIA standard.

Nowadays, high frequency signals are used that have a frequency of at least 3.2 GHz at a power of about 800 W or higher.

However, the known couplings are not designed for transmitting such high frequency signals and ensuring a good matching with regard to the frequency, simultaneously. For instance, couplings with an interface standardized according to ⅞" EIA are not designed for transmitting signals having a frequency of 3.2 GHz at 800 W. Accordingly, these couplings would be overloaded while being operated with signals having characteristics as mentioned above. Couplings having an interface according to 1⅝" EIA are neither designed for transmitting signals having such characteristics as they would have to be used in a frequency range being not approved. This results in a mismatch with regard to the frequency as couplings having an interface according to 1⅝" EIA are designed for frequencies up to 1-2 GHz.

Accordingly, it is not possible to transmit high frequency signals having a frequency higher than 2 GHz at more than 800 W via the couplings known in the state of the art.

SUMMARY

Thus, there is a need for a coupling that can be used for transmitting high frequency signals having a frequency higher than 2 GHz at more than 800 W while ensuring good matching.

Embodiments of the present disclosure provide a coupling for interconnecting at least one amplifier unit with at least one antenna wherein the coupling has a first interface that is standardized according to Electronic Industries Alliance with regard to the imperial system and a second interface that is standardized according to 13-30 DIN.

Embodiments of the present disclosure also provide a system comprising a coupling as mentioned above.

Further, embodiments of the present disclosure provide a method for transmitting a signal between an antenna and an amplifier unit or an analyzing unit by using a coupling as mentioned above wherein at least one signal having a frequency up to 6 GHz at up to 2 kW is transmitted via the coupling.

Accordingly, high frequency signals having a frequency higher than 2 GHz at more than 800 W can be transmitted via the coupling that is configured to be connected to a hollow conductor or waveguide having the size 13-30 with regard to the metric system. For instance, a waveguide or hollow conductor formed by a high frequency pipe can be connected to the coupling, for example, a high frequency pipe that is formed coaxially. The high frequency pipe can be part of a pipe system. In addition, the high frequency pipe can be connected to another component via the coupling wherein the component uses the EIA standard. The other component can be a cable, for instance. Thus, the coupling can be used to connect a high frequency pipe with a cable and vice versa.

According to an aspect, the coupling is configured to transmit signals having a frequency up to 6 GHz at a power up to 2 kW. The transmission is not limited by the coupling anymore since high frequency signals that are transmitted via 13-30 hollow conductors can be transmitted via the coupling without any restrictions.

According to another aspect, the first interface is configured to be connected with a cable. The cable may be standardized according to EIA standard. Thus, the cable can be connected to the amplifier unit such that the coupling is connected to the amplifier unit via the cable.

Further, the second interface may be configured to be connected with a hollow conductor. The hollow conductor is also called waveguide and it is established by a pipe, for instance. As the second interface is standardized according to the metric system while having the metric size 13-30, the second interface is configured to be connected with a 13-30 hollow conductor, in particular a high frequency pipe having that size.

According to an embodiment, the first interface is configured to be connected with a hollow conductor. The hollow conductor may be standardized according to EIA standard.

In some embodiments, the second interface is configured to be connected with a cable. The cable may be standardized according to metric system while having the metric size 13-30. Thus, the cable can be a coaxial cable that interconnects the coupling and the amplifier unit.

In some embodiments, the coupling comprises an inner conducting portion having a diameter of 13 mm and an outer conducting portion having a diameter of 30 mm. Thus, the second interface is configured to be connected with a hollow conductor being formed coaxially, for instance a high frequency pipe being a coaxial high frequency pipe.

According to a certain embodiment, the coupling comprises a space that is vented. Therefore, ionization within the coupling can be prevented or at least minimized effectively as an air exchange is provided. Signals having a high power can be transmitted via the coupling since the risk of ionization is at least minimized due to the venting.

In some embodiments, the space is located between the inner conducting portion and the outer conducting portion. This space is typically suspended to ionization. As this space is vented, the risk of ionization in this portion is at least minimized due to the air exchange.

According to an aspect, an amplifier unit is provided that is connected with the coupling, for example, with the first interface. The amplifier unit may be connected via a cable with the first interface being standardized according to EIA. Thus, the cable used may also have an interface being standardized according to EIA.

According to another aspect, an analyzing unit is provided that is connected with the coupling, for example, with the first interface. The analyzing unit may be connected via a cable with the first interface being standardized according to EIA. Thus, the cable used may also have an interface being standardized according to EIA.

Generally, the system may be operated in inverted manner.

Furthermore, an antenna may be provided that is connected with the coupling, for example, with the second interface. The antenna can be connected to the second interface via a coaxially formed high frequency pipe having an inner conducting part with a diameter of 13 mm and an outer conducting part with a diameter of 30 mm. This ensures that high frequency signals having a frequency up to 6 GHz at a power up to 2 kW can be transmitted via the coupling. Accordingly, high frequency signals can be used without any limitations or restrictions.

Generally, the coupling will neither be overloaded by the power of the high frequency signals nor used in a frequency range that might lead to a mismatch or at least matching problems.

According to an aspect, the power of the signal transmitted is between 0.5 kW and 2 kW. Accordingly, high power signals can be transmitted via the coupling without any problems.

The system may comprise the coupling as described above and a cable connected to that coupling such that a connector is established.

In general, the first and/or second interface(s) can be formed as a plug or socket for receiving a plug, respectively.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
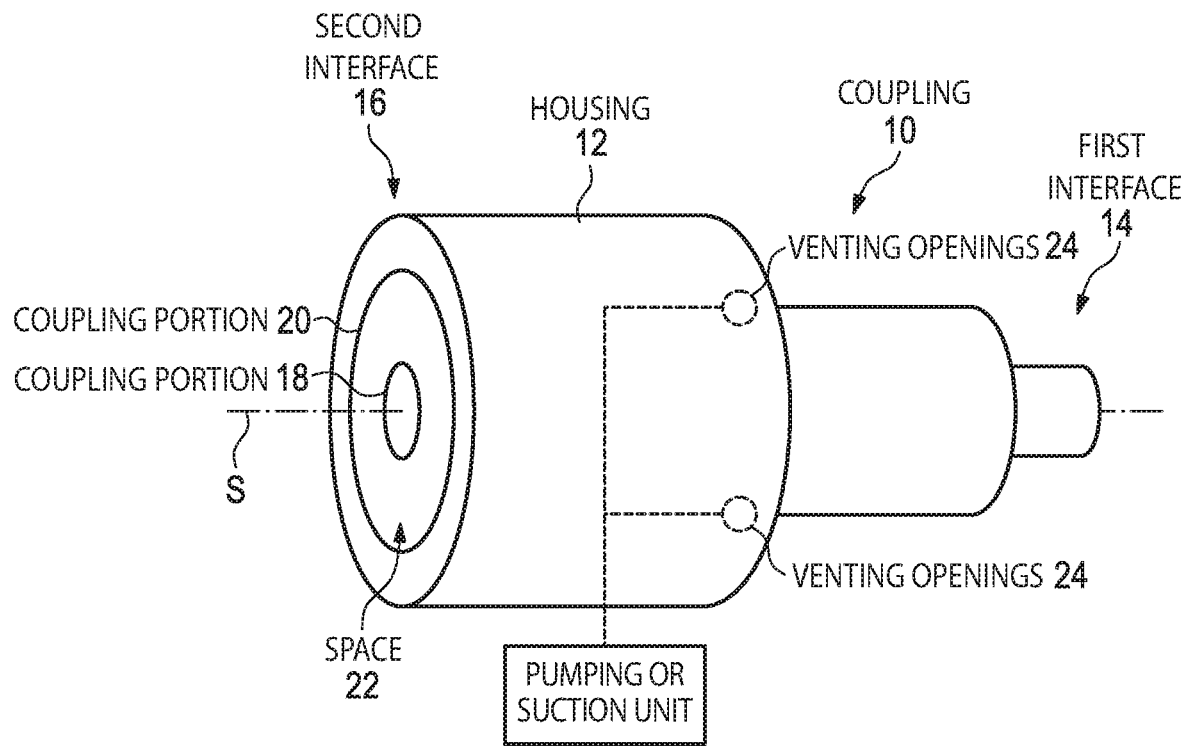
FIG. 1 schematically shows a coupling according to an embodiment of the present disclosure.

In FIG. 1, a coupling 10 for interconnecting at least one amplifier unit with at least one antenna is shown. The coupling 10 comprises a housing 12 that defines the main body of the coupling 10 wherein the coupling 10 has a first interface 14 and a second interface 16 at its axial ends being opposite to each other.

The first interface 14 is standardized according to Electronic Industries Alliance with regard to the imperial system (inch). In the shown embodiment, the first interface 14 is configured to be connected with a cable.

In contrast thereto, the second interface 16 is standardized according to 13-30 DIN which means the metric system. Accordingly, the second interface 16 has an inner conducting portion 18 having a diameter of 13 mm and an outer conducting portion 20 having a diameter of 30 mm. Both conducting portions 18, 20 are coaxially formed around an axis S that corresponds to the axis of symmetry. In the shown embodiment, the second interface 16 is configured to be connected with a coaxial hollow conductor, for example, a high frequency pipe being formed coaxially.

As both conducting portions 18, 20 have different diameters, a space 22 is provided that is located between both conducting portions 18, 20. This space 22 can be filled with air or any other suitable gas. Further, the space 22 is vented such that ionization of its filling material, in particular air or the suitable gas, is at least minimized as the filling material is exchanged continuously. For venting purposes, the coupling 10 has venting openings 24 that are in flow connection with the space 22 such that the filling material of the space 22 can be exchanged via these venting openings 24. Therefore, the venting openings 24 can be connected to a pumping and/or suction unit, appropriately.

The coupling 10 is configured to transmit signals up to 6 GHz at a power up to 2 kW such that signals being transmitted via a hollow conductor having the metric size 13-30 can be transmitted via the coupling 10 without any losses or restrictions with regard to the power and/or frequency range.

Generally, the interfaces 14, 16 can be formed as a plug for being connected with a socket and/or a socket for being connected with a plug, respectively.

According to an alternative embodiment, the first interface 14 is configured to be connected with a hollow conductor and the second interface 16 is configured to be connected with a cable, for example, a coaxial cable. Thus, a hollow conductor standardized according to EIA standard can be connected to a cable standardized according to the metric system via the coupling 10.

In general, the coupling 10 can be used for transmission and receiving purposes, respectively. Furthermore, the coupling 10 in some embodiments can be part of a system that comprises the coupling 10 and a cable 28 that is connected to the coupling 10, for example, the first interface 14. Accordingly, this system corresponds to a connector 30 having a cable 28 standardized according to EIA and one interface provided by the second interface 14 that is standardized according to 13-30 DIN.

Figure 2:
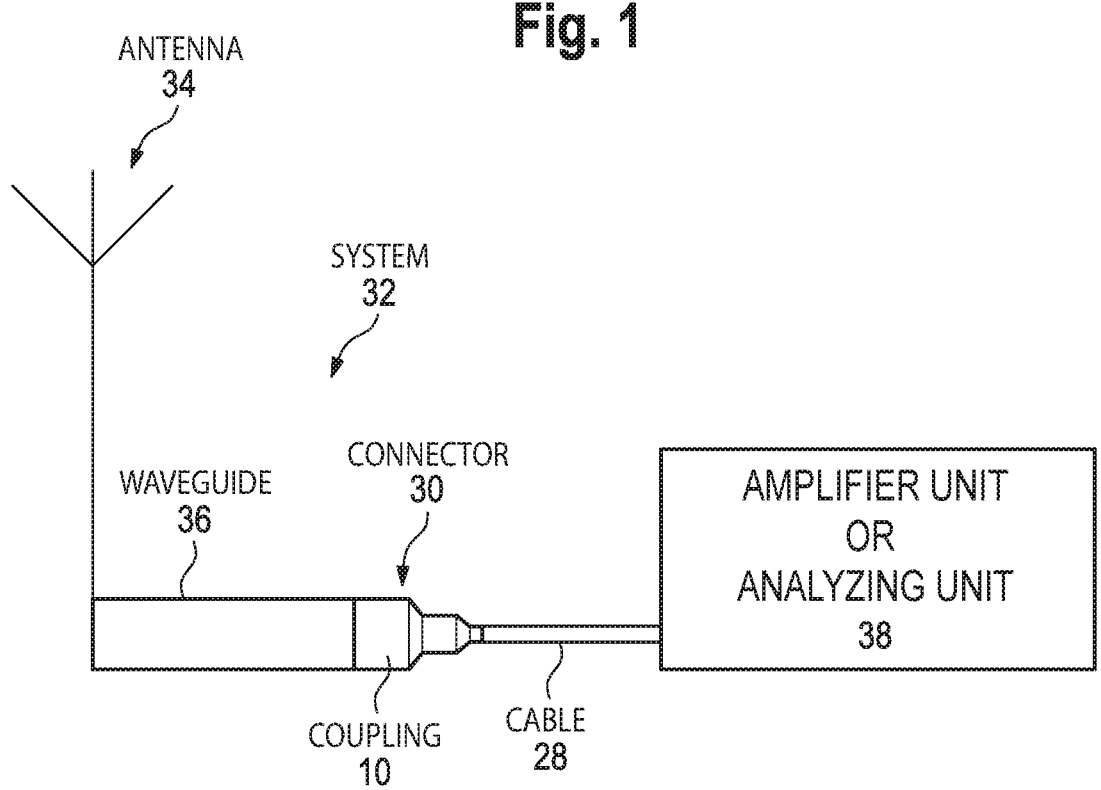
FIG. 2 shows a system according to an embodiment of the present disclosure.

Such a system is shown in FIG. 2 as a part of a superior system 32 that also comprises the coupling 10 among other parts. The whole system 32 shown in FIG. 2 comprises an antenna 34, a waveguide 36, the coupling 10, the cable 28 and an amplifier unit 38 or an analyzing unit 40.

The antenna 34 is connected to the coupling 10 via the waveguide 36 being a coaxially formed high frequency pipe that has an inner conducting part with a diameter of 13 mm and an outer conducting part with a diameter of 30 mm.

As the second interface 16 is standardized according to 13-30 DIN, the hollow conductor or waveguide 36 matches exactly the second interface 16 of the coupling 10, in particular the conducting portions 18, 20. Therefore, high frequency signals having a frequency up to 6 GHz at a power up to 2 kW that can be transmitted via the 13-30 hollow conductor 36 may be forwarded via the coupling 10 to the cable 28 standardized according to EIA standard. The high frequency signals can be analyzed in the analyzing unit 40.

Furthermore, the system 32 and the coupling 10 can be operated inversely. Thus, the amplifier unit 38 transmits a high frequency signal via the cable 28, the coupling 10 and the 13-30 hollow conductor 36 connected to the coupling 10 such that the high frequency signal is forwarded to the antenna 34 for broadcasting purposes.

Therefore, the system 32 and the coupling 10 are configured to transmit signals having a frequency up to 6 GHz at a power up to 2 kW wherein the power of the signal typically transmitted is between 0.5 kW and 2 kW.

Generally, a coupling and a system are provided that can be used for processing signals that are used in high frequency applications nowadays.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system comprising a coupling and at least one of an amplifier, an analyzer, or an antenna, which is connected to said coupling, said coupling having a housing that defines a main body of said coupling, said coupling further having a first interface that is standardized according to Electronic Industries Alliance with regard to the imperial system and a second interface that is standardized according to 13-30 DIN, said first interface and said second interface being located at first and second axial ends of said housing, respectively, said first and second axial ends being opposite to each other, said coupling being configured to transmit signals having a frequency higher than 2 GHz and up to 6 GHz at a power more than 800 W and up to 2 kW, wherein said housing encompasses a space that is vented via venting openings that are provided in the housing, wherein the venting openings are in flow connection with the space that is located between an inner conducting portion and an outer conducting portion of said coupling, and wherein the venting openings are connected to a pumping unit or a suction unit.

2. The system according to claim 1, wherein said amplifier or said analyzer is connected with said first interface.

3. The system according to claim 1, wherein said antenna is connected with said second interface.

* * * * *